UNITED STATES PATENT OFFICE 2,374,805

STERILIZATION OF WATER FOR DRINKING PURPOSES

James A. Camelford, Cleveland, Ohio, assignor to Buckeye Laboratories Corporation No Drawing. Application October 18, 1943, Serial No. 506,781

2 Claims. (Cl. 21—60)

My invention relates in general to a process for removing biological contaminations from water to be used for drinking purposes, and to render it in a suitable condition for such use, especially with respect to strict standards of palatability and hygiene.

In general, all water used for drinking purposes can be divided into two main classes, depending upon the source: (A) surface, and (B) deep.

Surface waters compose those collected at or near the surface of the ground and include rain, lakes, rivers and reservoirs. This type is exposed to contamination from many sources, and invariably contains micro-organisms.

Deep waters are collected from underground sources such as wells, especially of the artesian type, and springs. Since it usually undergoes a process of filtration during percolation through the soil, it is quite possible for this water to be bacteria-free at the source.

The main sources of drinking water, however, are the surface waters which invariably contain bacteria; for example, the common saprophytes are always present. Due to contamination by surface drainage or even sewage, it is frequently found that pathogenic organisms are present, and endemic diseases, and even serious epidemics, especially of enteric fever, dysentery, typhoid fever and cholera have resulted from the use of such waters. Drinking water, therefore, is one of the commonest vehicles for infection.

An object of my invention is to provide for the removal of micro-organisms from water to render it sterile.

Another object of my invention is to remove micro-organisms, particularly of pathogenic character, from waters obtained from natural sources to render it in a state suitable for meeting the normal metabolism requirements of vertebrates in general, and of man and domesticated animals in particular.

It is still another object of my invention to remove micro-organisms from water for drinking purposes without the deterioration in the palatability of the product associated with thermal sterilization.

Another object of my invention is to destroy micro-organisms from water to be used for drinking purposes by subjecting the water to a process utilizing instantaneous pressure change accompanied by a great extension of surface at the diminished pressure.

Another object of my invention is to subject water contaminated with micro-organisms to a positive pressure followed by an instantaneous and simultaneous subjection to a high degree of vacuum while dispersed in extremely small discrete particles to present a greatly extended surface to the vacuum to destroy the micro-organisms present and to render the water in a potable condition.

Still another very important object of my invention is to provide a sterile, palatable, and refreshing drinking water by subjecting a contaminated water to a positive pressure, applying sufficient thermal energy to provide the latent heat of vaporization at an absolute pressure of one inch of mercury, for a small proportion, not exceeding ten percent of the total quantity of water being treated, and presenting the water in the form of small discrete particles by spraying into a vessel maintained at high vacuum of the order of 29 inches of mercury as referred to a 30-inch barometer to destroy the micro-organisms present in the water without affecting the composition of the mineral salts present in the water which enhance its taste and palatability.

It is yet another object of my invention to remove noxious flavors due to gases in solution and destroy micro-organisms present in water for drinking purposes by subjecting the water to a process of applying positive pressure followed by exposure in the form of small discrete particles to the action of high vacuum of the order of at least 29 inches of mercury as referred to a 30-inch barometer.

Other objects and a fuller understanding of my invention may be obtained by referring to the following description and claims.

I have found by a series of experiments that, when an aqueous medium containing aerobic micro-organisms is subjected to high vacuum while the surface presented to the vacuum is extended mechanically or physically to its greatest possible value with respect to total mass by dividing the liquid into the smallest possible integral masses and imposing on these masses a spheroid form, not only is subsequent propagation of these micro-organisms impossible in laboratory culture, but that the aerobic micro-organisms originally present are no longer identifiable in the aqueous medium. Upon extension of this investigation to other types of bacteria, I discovered that when similar media containing anaerobic organisms were first subjected to a positive pressure greatly in excess of atmospheric pressure, and then presented to the action of high vacuum as described above, that destruction of these types of micro-organisms was also accomplished.

Sterile distilled water was inoculated with developed cultures of various micro-organisms (for example, chromobacterium prodigiosus, Saccharomyces cerevisiae, micrococcus luteus), and subjected to a pressure of the order of 100 pounds per square inch while maintained at temperatures below the optimum for growth as established by reference to the literature, that is, below a temperature of 100° Fahrenheit in each case, and then sprayed into a vessel maintained at a vacuum of approximately 29 inches of mercury. I found that the concentration of organisms, as established by the standard agar plate count procedure, was always greatly diminished, and in a number of cases, the agar plates showed no colony development.

I also discovered that when the initial positive pressure was established at values greater than 1000 pounds per square inch, but not exceeding 5000 pound per square inch in any instance, and by establishing a temperature for treatment based on the theoretical equivalent of the heat energy required for vaporization of one-tenth of the total quantity of liquid to be treated at the lowest pressure value, that is, at a vacuum of 29 inches, destruction of the micro-organisms initially present could be accomplished in every case, irrespective of the type of organism.

It has been stated above that when aerobic micro-organisms alone are present, the dispersion of the contaminated water in vacuo is effective in destroying this type of organism. I have also found that many types of anaerobic bacteria have low resistance to pressure change or to temperature change. Consequently, to meet the requirements for any specific application, I may use positive pressures antecedent to the vacuum treatment varying between that required only to impart a directional velocity to the liquid and to provide the required dispersion at the spray nozzle, and the maximum value of 5000 pounds per square inch required for exceedingly resistant strains.

The loss of liquid due to distillation at the reduced pressure never exceeded seven per cent of the original quantity, and was usually about five percent, while the temperature of the liquid after treatment was considerably lower than its temperature when introduced into the vacuum vessel. That is to say, I discovered that the extension of surface at the vacuum employed was accompanied by an increase in volume in the liquid phase as well as by partial ebullition, and this change in energy level was accomplished by withdrawal of thermal energy from the mass of the liquid, as evidenced by the decrease in temperature.

When the process of my invention is applied to water for drinking purposes, the contaminated water is withdrawn from a reservoir or vessel through a strainer or filter to remove solid impurities to a high pressure pump to subject it to a positive pressure of the degree defined above. From the pressure pump it passes through a heater, where the temperature is raised usually to about 125° Fahrenheit, thence through a spray nozzle into a vessel maintained at as nearly perfect vacuum as possible. I have found, since some degree of vaporization must necessarily occur, that a slight pressure change, not to increase the absolute pressure to more than one inch of mercury, has no practical deleterious effect on the efficiency of the process. In establishing the temperatures at which I prefer to operate my process, the lower limit will necessarily be that temperature at which the water possesses a heat content sufficient to vaporize only a small fraction of the water at the degree of vacuum used, together with the thermal energy required to balance the entropy and the heat losses inherent to the design and character of the vacuum chamber and surroundings. Ordinary room temperature, that is to say, approximately 70° Fahrenheit, represents a feasible lower limit.

The upper limit would be defined as that temperature beyond which the loss of product due to distillation or evaporation is excessive. Temperatures approaching thermal death-points of the micro-organisms present as determined by flash pasteurization methods are never required, and even in cases of concentrated contamination due to recognized resistant types of bacteria, a temperature of substantially 125° Fahrenheit was sufficient for effective utilization of the process, and to produce complete sterilization.

I also prefer to use an adjustable nozzle, since the degree of dispersion can be readily adjusted should the exigencies of operation demand an altered time interval of existence of the water in the dispersed state or of size of the dispersed particles. In general, the extent of the incidence of undesirable micro-organisms will determine the size of the liquid particles and consequently the time in which the liquid will persist in the dispersed form.

After spraying, the liquid is collected in a vessel maintained under vacuum until use. It is desirable to provide means for baffling the exhaust to the vacuum pump to avoid loss by entrainment of the small liquid particles.

A number of samples of defined types of drinking water were subjected to the operation of my process, and a table is given of the results. The bacteriological tests were made in accordance with the standard procedure of the American Public Health Association as defined in their publication "Standard Methods of Water Analysis," 8th edition, 1940. The waters tested represent a cross-section of the types used for this purpose. In every case, it was found that plate counts were exceedingly low, and in fact in two cases the plates were negative. The standard test for coliform organisms showed negative results in every instance, even in the highest concentrations in the MacConkey broths, whereas B. coli was found to be present in four of the original samples, and in two cases, present in concentrations beyond the permissible limits of safety for use as drinking water. The results are shown in the table below:

Table

| Sample | Before treatment | | After treatment | |
|---|---|---|---|---|
| | Agar plate 37° C. colonies per c. c. | Coliform bacteria per 100 c. c. | Agar plate 37° C. colonies per c. c. | Coliform bacteria per 100 c. c. |
| Shallow well, Auburn, Ohio | 24 | 6 | 2 | Nil |
| Deep Well, Bainbridge, Ohio | 8 | 1 | Nil | Nil |
| Reservoir, Cleveland, Ohio | 32 | Nil | 2 | Nil |
| Lake Erie, Euclid, Ohio | 18 | 2 | Nil | Nil |
| Stock pond, Russell, Ohio | 62 | 14 | 3 | Nil |

I have also discovered that where unpalatability in a water supply is due to solution of gases, which, while biologically innocuous, may be obnoxious, such as waters containing hydrogen sulfide, $H_2S$, or nitreous or nitric oxides, the potability of these waters may be greatly improved by the use of my process. This is due to the fact that gas solubility in a liquid medium is invariably a function of pressure and temperature, and when water containing such a gas in solution is exposed at comparatively low temperature to vacuum of high order, the partial pressure equilibria are moved so far to the right as to preclude the retention of critical or appreciable quantities of the gas in solution. For example, an artesian water of offensive odor and taste was rendered substantially free from the presence of dissolved sulfur, as evidenced by the silver strip test, where the original water caused the silver strip to blacken, while the treated water caused no visible diminution of the luster of the silver strip after 48 hours.

I advance no theory as to the mechanism of the destruction of micro-organisms by the use of my process, although I believe it to be primarily one of initial dialysis through the cellular membrane comprising the outer walls of the organisms, reducing the surface tension of the contained liquids within the walls to a point where they are susceptible to volume or phase change on exposure to vacuum.

Although I have described my invention with a certain degree of particularity, it is understood that the present disclosure has been made only by way of example and that numerous changes in the details of steps and the combination and arrangement of parts may be resorted to without departing from the spirit and the scope of the invention as hereinafter claimed.

I claim as my invention:

1. The process for destroying organisms in water intended for potable use comprising the steps of withdrawing the water from a supply container and then subjecting the water to a pressure of the order of 1000 to 4000 pounds per square inch, raising the temperature of the water in the neighborhood of 125° F., and presenting it in the form of small discrete particles to the action of high vacuum to destroy the organisms and to render the water in a potable condition, and collecting the treated water in a container separate from the supply container.

2. The process for destroying organisms in water intended for potable use comprising the steps of withdrawing the water from a supply container and then subjecting the water to a pressure of the order of 1000 pounds per square inch, raising the temperature of the water to a value less than that required to kill the organisms by thermal action, and presenting it in the form of small discrete particles to the action of high vacuum to destroy the organisms and to render the water in a potable condition, and collecting the treated water in a container separate from the supply container.

JAMES A. CAMELFORD.